UNITED STATES PATENT OFFICE.

N. SPENCER THOMAS, OF PAINTED POST, NEW YORK.

IMPROVED COMPOSITION FOR REMOVING INCRUSTATIONS FROM BOILERS.

Specification forming part of Letters Patent No. 57,219, dated August 14, 1866.

*To all whom it may concern:*

Be it known that I, N. SPENCER THOMAS, of Painted Post, New York, have invented a new and Improved Composition for Removing and Preventing Incrustations in Steam-Boilers; and I do hereby declare that the following is a full, clear, and exact description thereof, which will enable others skilled in the art to make and use the same.

This invention relates to a compound which when introduced into a steam-boiler will prevent the formation of incrustations or scales, and which can also be used with advantage for the purpose of removing scale already formed in steam-boilers.

My composition is made of an extract of hemlock-bark, or any other substance of a like nature containing a large quantity of tannin, and of corn-meal or other similar material containing a large percentage of starch, and these ingredients I mix together in about the following proportions: Extract of hemlock-bark or other similar substance, one pound; corn-meal or other similar substance, two or three pounds. I mix the ingredients either by grinding them together or by reducing the extract of hemlock-bark to a fine powder and straining it with the corn-meal; or said extract may be used in a liquid state and mixed with the corn-meal to a paste, which can be conveniently introduced in the steam-boiler; or, if desired, each of the ingredients may be introduced separately.

By the combined action of the extract of hemlock-bark and of the corn-meal the formation of scale in the boiler is effectually prevented and scale already formed in the boiler is removed, and the cost of my composition is trifling when compared with the great advantages derived from it.

What I claim as new, and desire to secure by Letters Patent, is—

A compound for removing and preventing incrustations in steam-boilers, made of the ingredients herein set forth, and mixed together or applied in about the proportion specified.

N. SPENCER THOMAS.

Witnesses:
 JNO. DAY,
 JAMES M. SMITH.